Feb. 19, 1924.
H. E. BROWN
1,484,111
PRESSURE DEMONSTRATING APPARATUS
Filed Feb. 4, 1920    2 Sheets-Sheet 1
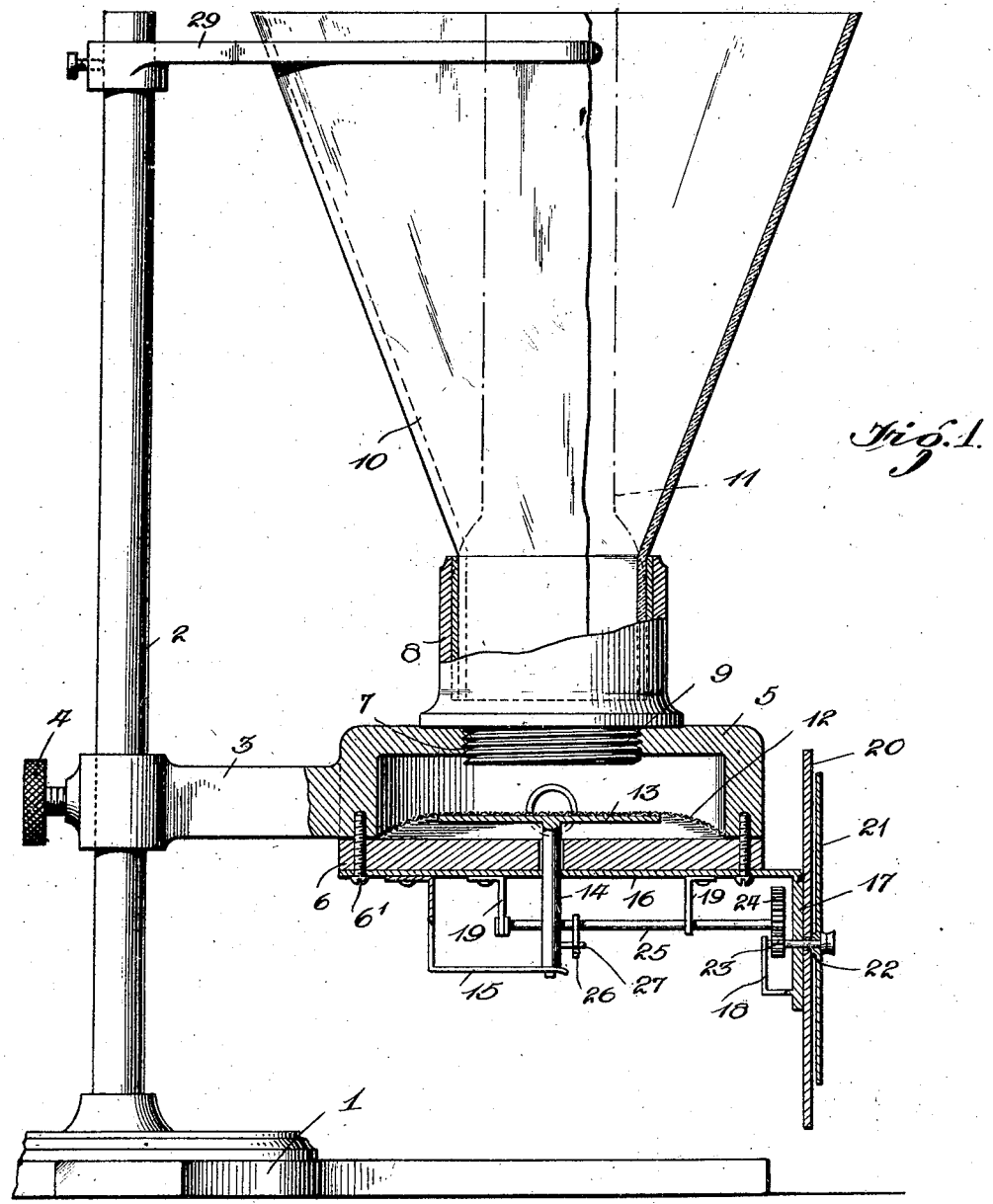
Fig. 1.
Fig. 4.
Inventor
Hugh Everett Brown
By Mason Fenwick Lawrence,
Attorneys Feb. 19, 1924.  
H. E. BROWN  
1,484,111  
PRESSURE DEMONSTRATING APPARATUS  
Filed Feb. 4, 1920  2 Sheets-Sheet 2

Inventor  
Hugh Everett Brown  
Mason Fenwick Lawrence  
Attorney

Patented Feb. 19, 1924.

1,484,111

UNITED STATES PATENT OFFICE.

HUGH EVERETT BROWN, OF CHICAGO, ILLINOIS, ASSIGNOR TO W. M. WELCH MANUFACTURING COMPANY, OF CHICAGO, ILLINOIS, A CORPORATION OF ILLINOIS.

PRESSURE-DEMONSTRATING APPARATUS.

Application filed February 4, 1920. Serial No. 356,315.

*To all whom it may concern:*

Be it known that HUGH EVERETT BROWN, a citizen of the United States, residing at Chicago, in the county of Cook and State of Illinois, has invented certain new and useful Improvements in Pressure-Demonstrating Apparatus; and he does hereby declare the following to be a full, clear, and exact description of the invention, such as will enable others skilled in the art to which it appertains to make and use the same.

This invention relates to apparatus for demonstrating the truth of the law that the force which a liquid exerts against any surface is equal to the area of the surface times its average depth times the density of the liquid, and is not dependent upon the shape of the containing vessel or the mass of liquid above the given area of pressure. An apparatus of this sort has been sometimes known as a Pascal vase apparatus. It is my object to improve such an apparatus and especially to render it more simple and more sensitive and easy to operate in indicating pressures. To that end, I have devised a pressure surface in the form of a sensitive diaphragm of flexible material normally urged in a direction to resist pressure and yieldable to the pressure of the liquid, the yielding movement being utilized to indicate degrees of pressure through a dial or other indicator.

In the drawings,

Figure 1 is an elevation partly in section of the complete apparatus.

Figure 4 is a fragment of the diaphragm.

Similar reference characters indicate corresponding parts throughout the several views.

Figure 2:
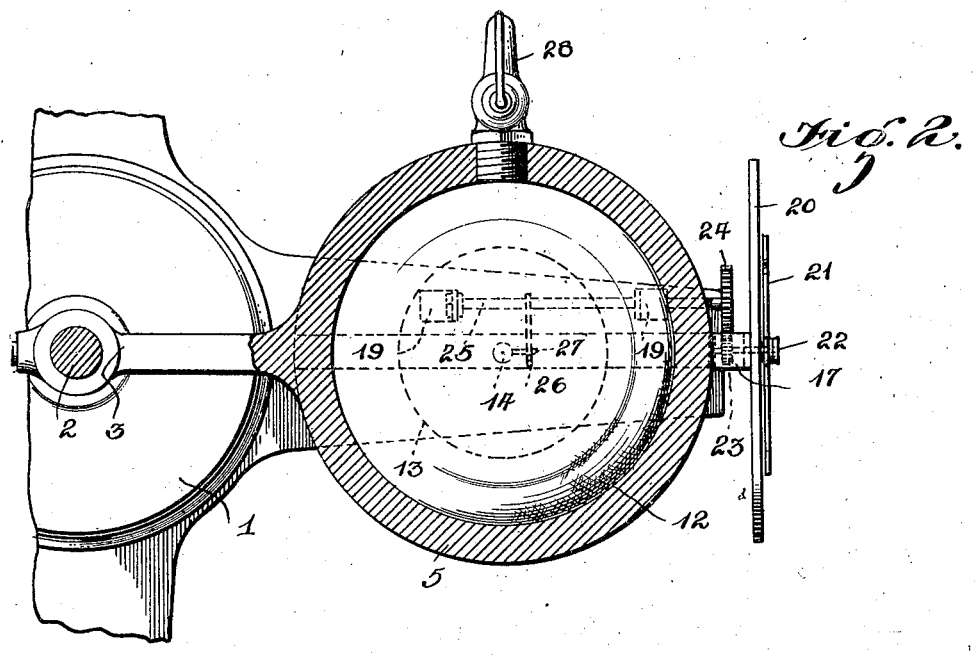
Figure 2 is a horizontal section through the diaphragm-containing chamber of the apparatus.
Figure 3:
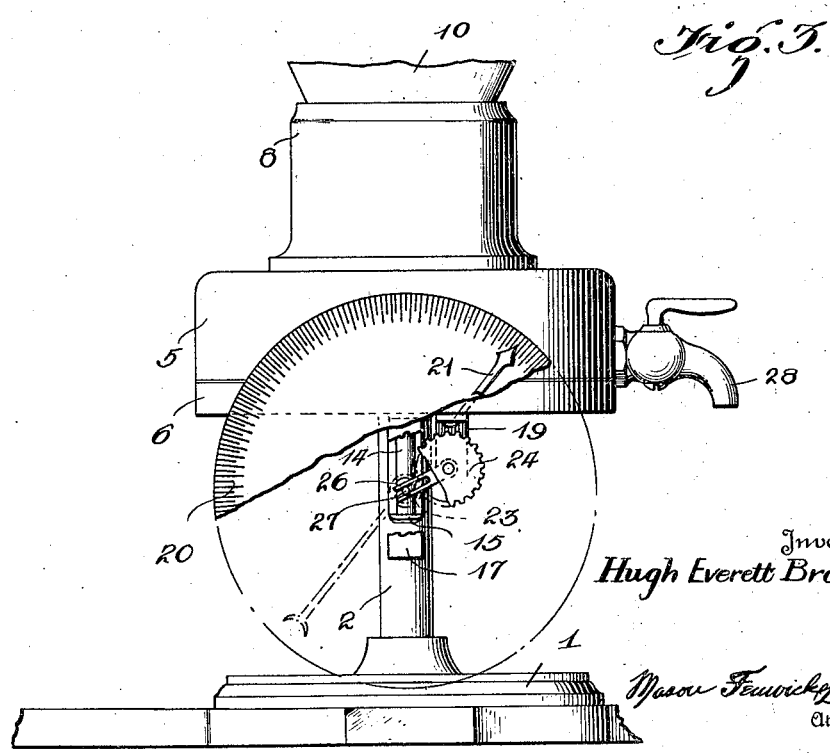
Figure 3 is a view showing the indicator and its actuating means.

In the drawings, 1 indicates the base; 2, a standard arising therefrom constituting a support of a kind that is common in laboratory apparatus. Adjustably mounted on the standard 2 is a bracket arm 3 which may be secured at various points upon the standard by set screw 4. Integral with the bracket 3 is a hollow member or chamber 5 having its lower side closed by a clamping member or plate 6 and a threaded orifice 7 in its upper side. This hollow member constitutes the permanent pressure chamber or base portion of the liquid container of the apparatus under consideration. The clamping member 6 is shown as a plate having a central opening therethrough, but it may be pointed out at this time that the size of the opening is of no particular consequence. In fact the clamping member may be in the nature of a ring.

The base member 5 is adapted to have secured to it in the threaded orifice 7 any one of a plurality of receptacles or vases of different shapes. Each receptacle or vase comprises a hollow connecting member 8, open throughout, having a screw threaded terminal 9 adapted to be seated in the threaded orifice 7 of the hollow member 5. Sealed as by sealing-wax or the like within the connecting member 8 is a hollow body of glass, a glass body of one form being indicated in full lines in Figure 1 by the numeral 10, while by the broken line at 11 a glass body of different form is shown, said vases of different form being successively used in order to demonstrate that the pressure indicated by the dial, to be subsequently referred to, is the same, whatever the shape of the vessel, provided the depth of the liquid in each is the same and the liquid in each is of equal density.

The pressure responsive member which I have shown is a diaphragm 12 of some flexible, impervious, inelastic fabric, forming the bottom wall of the complete container. The material that I prefer to use is oiled silk. This diaphragm closes the lower portion of the chamber within the hollow member 5 and its edges are clamped between the plate 6 and the member 5, thus forming a packing to prevent the escape of liquid between the joints formed by the union of the plate 6 with the member 5. The inelastic flexible diaphragm 12 is bulged upward by the disk 13 connected to the stem 14, which passes through the plate 6 and rests upon a spring 15. Air may be freely vented around the stem 14. On the lower side of the plate 6 and secured to it by screws 6' which hold plate 6 to the member 5 is a supporting plate and bearings support 16. The plate 16 is provided at one side with a downward extending member 17 which at its lower end has a lateral and upward extending member 18. The plate 16 is also provided with two aligned depending bearing brackets or shaft hangers 19. On the outer face of the member 17 is secured a graduated dial 20 over which an indicator pointer 21 is adapted to be moved. The indicator 21 is secured to an arbor 22 which passes through the dial 20 and is journalled in depending plate 17 and bearing support 18. The arbor 22 carries a pinion 23 which meshes with a gear 24, the said gear 24 being secured to a shaft 25 journalled in the shaft hangers 19. On the shaft 25 is rigidly secured a lever arm 26 having a slot within which is engaged a pin 27 projecting laterally from said stem 14.

A faucet or stop-cock 38 is threaded into the side of the hollow member 5 in order to provide an exit and entrance port for liquid. A hose may be attached to the member 28 if desired and liquid admitted to the chamber so that it will rise within the vase attached to its upper part.

A second indicator in the shape of an arm 29 may be adjustably mounted on the standard 2 in order to indicate the level to which the vessel shall be filled.

In use, a vase or receptacle of one form will be secured upon the member 5, the indicator arm 29 will be set to a desired height and liquid may then be admitted into the apparatus through the faucet 28 until it reaches the level marked by the indicator arm 29. The pressure of the liquid upon the diaphragm 12 will be transmitted through the diaphragm 12, stem 14, pin 27, lever 26, shaft 25, gears 24, 23, and arbor 22 to the indicator pointer 21. The precise pressure shown by the indicator will then be noted. The liquid may then be exhausted through the faucet 28. The first vessel may then be removed, and a vessel of another shape applied to the member 5. Liquid may be admitted thereto as before described, care being taken to see that it arises to the exact height marked by the indicator arm 29. If the liquid admitted is of the same density as that admitted into the first vessel, it will be found that the reading for the indicator is the same as before.

This apparatus is simple and sensitive; the diaphragm 12 of oiled silk or the like is susceptible of transmitting delicately the pressure applied to it; the diaphragm being of inelastic material has great sensibility and will retain its accuracy for a long period.

What I claim is:

1. In a pressure indicating device, a hollow supporting base having an opening in its upper wall adapted to receive a liquid-containing vessel, the lower end of the base being open, a flexible diaphragm secured to said base, a cover plate secured to said base below said diaphragm indicating means actuated by movement of said diaphragm, and means for supporting said actuating means on said cover plate.

2. In a pressure indicating device, a hollow supporting base having an opening in its upper wall adapted to receive a liquid-containing vessel, the lower end of the base being open, a flexible diaphragm secured to said base and closing said lower open end, a member below the diaphragm securing the latter to the rim of the said lower open end of the base, indicating means actuated by movement of the diaphragm and supported entirely on said member, whereby when the said member is disengaged from the base the entire indicating mechanism is removable as a unit therewith.

3. In a pressure indicating device, a hollow supporting base having an opening in its upper wall adapted to receive a liquid-containing vessel, the lower end of the base being open, a flexible diaphragm secured to said base and closing said lower open end, a member below the diaphragm securing the latter to the rim of the said lower open end of the base, indicating means actuated by movement of the diaphragm and supported entirely on said member, whereby when the said member is disengaged from the base the entire indicating mechanism is removable as a unit therewith, said indicating means including a plunger disposed below the diaphragm and holding the latter in an upwardly directed position, a spring finger carried by said member and pressing upwardly on the plunger, said indicating means being operable by movement of the plunger.

In testimony whereof I affix my signature.

HUGH EVERETT BROWN.